United States Patent
Normann et al.

(10) Patent No.: US 6,801,872 B2
(45) Date of Patent: Oct. 5, 2004

(54) METHOD FOR DETERMINING THE SPEED OF A WHEEL ON A MOTOR VEHICLE

(76) Inventors: Norbert Normann, Panoramastrasse 12, Niefern-Schelbronn (DE), 75223; Gunter Lothar Schulze, Lutherstrasse 3, Ispringen (DE), 75228

( * ) Notice: Subject to any disclaimer, the term of this patent is extended or adjusted under 35 U.S.C. 154(b) by 0 days.

(21) Appl. No.: 10/221,637
(22) PCT Filed: Feb. 3, 2001
(86) PCT No.: PCT/EP01/01178
§ 371 (c)(1),
(2), (4) Date: Sep. 13, 2002
(87) PCT Pub. No.: WO01/69265
PCT Pub. Date: Sep. 20, 2001

(65) Prior Publication Data
US 2003/0042890 A1 Mar. 6, 2003

(30) Foreign Application Priority Data
Mar. 15, 2000 (DE) ......................................... 100 12 458

(51) Int. Cl.$^7$ ............................................. B60C 23/04
(52) U.S. Cl. ...................... 702/145; 73/146.5; 324/160
(58) Field of Search .................................. 702/125, 145, 702/195; 324/160; 73/146.5; 340/58, 444, 447

(56) References Cited

U.S. PATENT DOCUMENTS

| 3,786,413 A | * | 1/1974 | Ross et al. ................... 340/443 |
| 6,002,248 A | | 12/1999 | Binder |
| 6,204,758 B1 | * | 3/2001 | Wacker et al. .............. 340/444 |

* cited by examiner

Primary Examiner—John Barlow
Assistant Examiner—Victor J. Taylor

(57) ABSTRACT

There is described a method for determining the speed of a wheel on a motor vehicle, for which purpose an acceleration sensor is mounted on the wheel. It is proposed according to the invention to measure the frequency $\omega$ or the period T of an alternating signal contained in the acceleration signal supplied by the acceleration sensor and produced by the influence of gravitational acceleration g. The method is suited for use in automatic tyre-pressure monitoring systems for assigning signals, that have been transmitted by radio from a wheel-mounted electronic module, to a particular wheel position and for controlling the transmission rate of a wheel-mounted electronic module as a function of the speed.

8 Claims, 2 Drawing Sheets

METHOD FOR DETERMINING THE SPEED OF A WHEEL ON A MOTOR VEHICLE

Figure 1:
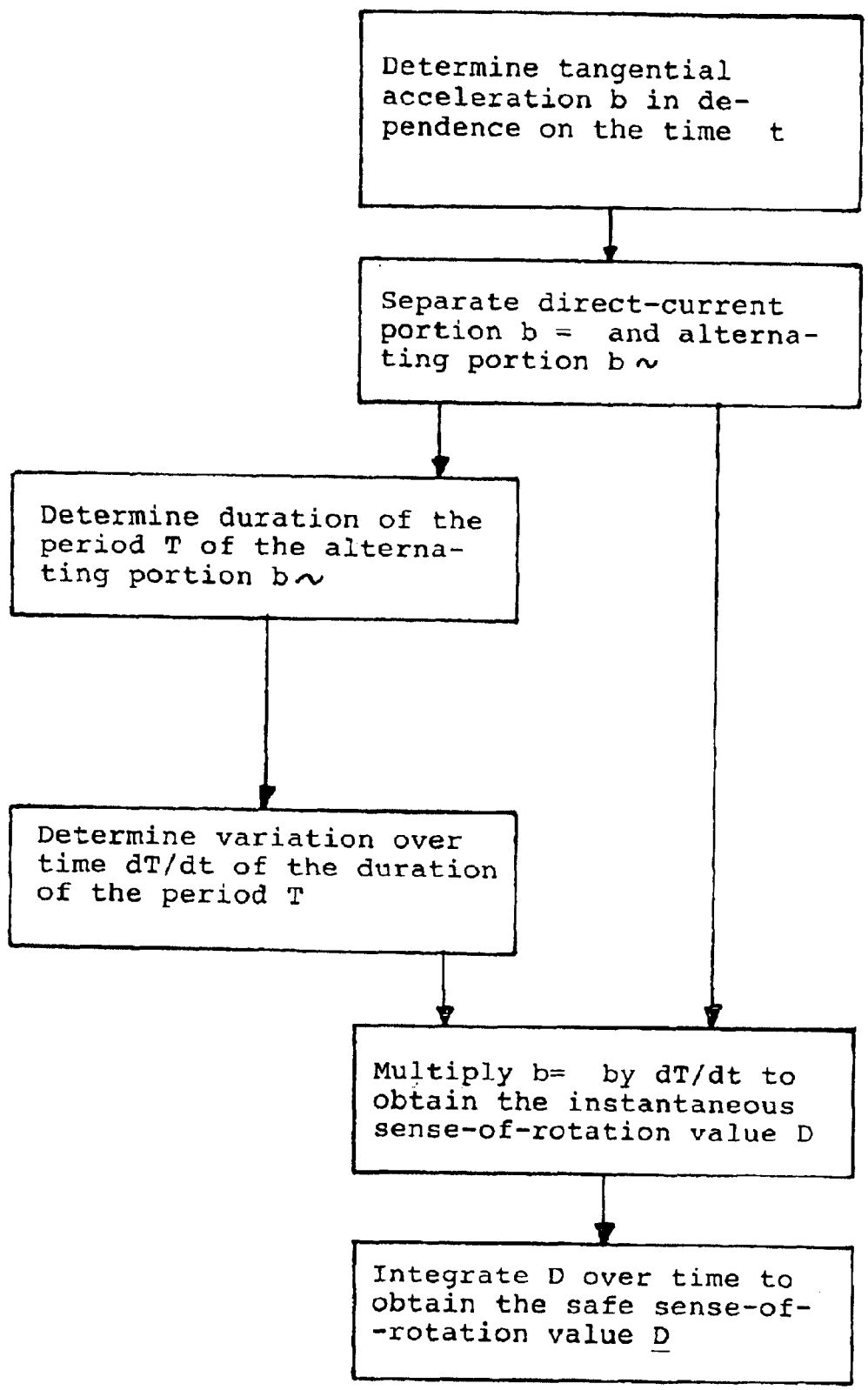

This application is filed under 35 U.S.C. §371 based upon International Application No. PCT/EP0/1178 filed on Feb. 3, 2001.

The present invention relates to a method for determining the speed of a wheel on a motor vehicle, for which purpose an acceleration sensor is mounted on the wheel. The necessity to determine the speed of a wheel arises for motor vehicles with wheels equipped with pneumatic tyres whose pressure is to be continuously monitored also in operation of the vehicle. DE 196 08 478 A1 describes for this purpose a tyre-pressure monitoring system where each wheel of a motor vehicle is equipped with a device (hereinafter referred to as wheel-mounted electronic module) that comprises a pressure sensor, an electronic evaluation sensor connected to the pressure sensor, a transmitter, a sending antenna and a battery for supplying the wheel-mounted electronic module with current. Neighbouring the wheels, there are mounted on the vehicle body receiving antennas connected by cable to a receiver which processes and evaluates the signals transmitted to it by the receiving antennas and provides a signal to the driver when a substantial, especially a dangerous, change in pressure is observed on any of the wheels, in which case the driver is simultaneously informed on the particular location of the wheel in question.

One problem encountered in connection with such tyre-pressure monitoring systems relates to the clear assignment of the individual transmitters to the location of the respective wheel on the vehicle. The transmitters generate for this purpose a signal that is subdivided into several sections and that comprises a preamble, an identification signal, a measurement signal and a postamble. The receiver is to determine by way of the identification signal (hereinafter referred to as identifier) the location where the sending wheel is mounted on the vehicle. This is, however, possible only if the identifier and the wheel position have been clearly allocated one to the other before and if such allocation has been stored in the receiver. DE 196 08 478 A1 discloses a way how to automatically determine such allocation from the signals transmitted by the wheel-mounted electronic modules after the first assembly of wheels on the vehicle and after every change of wheels. One performs for this purpose a statistical evaluation of the intensity of the signals received. Although each receiving antenna receives signals from all transmitting wheels of the vehicle, it is assumed that, regarded statistically, the signals received from the wheel that is the nearest to the respective receiving antenna will be received with the highest intensity on average.

A similar allocation method has been known from DE 196 08 479 A1.

Another way of automatically allocating the identifiers transmitted by the wheel-mounted electronic modules to the respective wheel locations is disclosed by DE 197 35 686 A1. This document proposes to design the wheel-mounted electronic module on the respective wheel in such a way that it will determine not only the tyre pressure but also additional information on the moving state of the wheel and transmit both data by radio to the central receiver in the motor vehicle. The moving state of the vehicle is used by the receiver to derive information on the location of the respective wheel on the vehicle. To this end, any accelerations encountered on the wheel are determined by acceleration sensors provided in the wheel-mounted electronic module, and either the acceleration data is evaluated in the wheel-mounted sensors provided in the wheel-mounted electronic module, and either the acceleration data is evaluated in the wheel-mounted electronic module, in which case the result of such evaluation is transmitted to the receiver by radio, or the acceleration signals are inserted by the wheel-mounted electronic module into the signal that is to be sent out regularly and that contains a data telegram and is sent, together with such signal, by radio to the receiver where it is evaluated.

The known system permits information on the wheel position to be derived from acceleration signals obtained on the wheel in the following ways:

1. When the wheel turns, a centrifugal acceleration is encountered on the wheel the strength of which depends on the speed of the wheel. The speed of spare wheels carried with the vehicle is equal to zero, even when the vehicle is moving. Any signals that are received when the vehicle is moving and that signal a speed equal to zero or a centrifugal acceleration Z equal to zero will therefore be allocated to a spare wheel carried with the vehicle.

2. When the speed or the value of the centrifugal acceleration Z is integrated over a predetermined period of time, then the value of the integrated measurand is a measure of the distance the wheel has travelled during that period of time. Given the fact that when cornering the steered front wheels travel a longer distance than the unsteered rear wheels of a vehicle, the integrated measurand for a steered front wheel will be greater than that for an unsteered rear wheel. The identifiers contained in signals that lead to the greatest integrated measurands for the speed or the centrifugal acceleration Z can therefore be assigned to the steered front wheels of a vehicle. It has been known from DE 197 28 419 A1 to determine the speed from an alternating signal contained in the tangential acceleration signal supplied by the acceleration sensor and produced by the influence of gravitational acceleration.

b is used here to describe the acceleration in the circumferential direction of a wheel encountered during acceleration or deceleration of the vehicle. The sign of the tangential acceleration signal b permits to distinguish between right and left wheels, and can be determined already in the wheel-mounted electronic module and then transmitted to the receiver. Although differentiation between right and left wheels is, preferable, effected in the acceleration phase following the start of the vehicle, it can generally be effected also in any acceleration or deceleration phase.

The tyre-pressure monitoring systems obtainable in practice have the wheel-mounted electronic modules mounted on the wheel inside the tyre and have a hermetically sealed housing that does not permit the battery to be exchanged. The battery is therefore expected to have a service life of 5 to 10 years. This requires the current consumption of the wheel-mounted electronic module to be minimised. For this purpose, it has been known to provide the wheel-mounted electronic module with an integrated circuit that activates the pressure sensor for measurements only during first time intervals and causes the transmitter to send signals during second time intervals longer than or equal to the first time intervals, i.e. in the first time intervals when a dangerous pressure loss has been detected, otherwise in the longer second time intervals.

Known wheel-mounted electronic modules have a semiconductor-based pressure sensor integrated into an integrated circuit. An acceleration sensor can also be integrated into such an integrated circuit. However, if according to DE 197 35 686 A1 two acceleration sensors or one acceleration sensor sensitive in two axes perpendicular one to the other are to be integrated into the integrated circuit in addition to the pressure sensor, then the development and production of the integrated circuit becomes considerably more complex and expensive.

BRIEF SUMMARY OF THE INVENTION

It is, therefore, the object of the present invention to open up a less expensive way of gaining signals in the wheel-mounted electronic module from which conclusions can be drawn on the location of the wheel.

This object is achieved by a method having the features defined in claim 1 and by a method having the features defined in claim 2. Advantageous further developments of the invention are the subject-matter of the sub-claims.

According to the invention, the speed of a wheel on which an acceleration sensor is mounted is determined as the frequency $\omega$ of an alternating signal produced by the influence of the gravitational acceleration g and contained in the acceleration signal b supplied by the acceleration sensor. Alternatively, the object is achieved by determining the reciprocal value of the speed, instead of the speed, by determination of the period T of an alternating signal produced by the influence of the gravitational acceleration g, which is contained in the acceleration signal b supplied by the acceleration sensor.

The invention provides essential advantages:

For determining the speed of the wheel or its reciprocal value no separate sensor is required; instead, these values are determined from the signals supplied by the provided acceleration sensor, whose acceleration signal b has a component with a frequency $\omega$, indicating the speed of the wheel, produced by the influence of the gravitational acceleration g. An acceleration sensor, which is designed and mounted on the wheel so as to pick up any acceleration acting tangentially on the wheel, will be sufficient for this purpose.

The tangential acceleration signal b of such a simple acceleration sensor contains, by superposition, a speed-dependent alternating portion because the tangential acceleration b acting on the acceleration sensor will be increased by the component of gravitational acceleration g acting in the tangential direction during downward movement of the acceleration sensor, while it will be decreased by the component of gravitational acceleration g acting in the tangential direction during upward movement of the acceleration sensor. The wheel speeds are predominantly in a range of below 40 r.p.s. Accordingly, the frequency of the alternating portion of the acceleration signal, produced by gravitational acceleration, is predominantly in a range below 40 Hz and can be separated from the direct-voltage portion of the electric acceleration signal supplied by the acceleration sensor by filtering.

The determination of the angular frequency $\omega$ or the period T of an electric alternating signal is easy and can be effected with high accuracy since, basically, that process can be regarded as a time measurement and time measurements can be carried out more easily and with higher accuracy than intensity measurements, which latter had to be performed according to DE 197 35 686 A1 for determining the speed from the centrifugal acceleration.

The tangential acceleration b and the speed $\omega$ or the period T can be measured by means of a single acceleration sensor, which latter must be sensitive only in the direction of a single axis, namely in the direction in which the tangential acceleration occurs. Sensitivity in a second axis or even a second acceleration sensor is not required.

For use in a tyre-pressure monitoring system it is, therefore, only necessary to integrate, in addition to the pressure sensor, a single additional acceleration sensor, sensitive to tangential acceleration, into the integrated circuit of the respective wheel-mounted electronic module.

The technical input for the development and production of the integrated circuit can, therefore, be reduced.

The compound signal supplied by the acceleration sensor may be used, according to the method known from DE 197 35 686 A1 (see items 1. to 3. above) to allocate signals, that are sent out by the wheel-mounted electronic modules when the vehicle is moving and that signal that the speed is equal to zero, to a spare wheel and to differentiate between steered front wheels and unsteered rear wheels with the aid of an integrated measurand of the speed or the period, because the integrated measurand of the speed will be greater for a steered front wheel than for an unsteered rear wheel and the integrated measurand of the period will be smaller for a steered front wheel than for an unsteered rear wheel. Finally, it is possible, as disclosed in DE 197 35 686 A1, to differentiate between wheels on the right side of the vehicle and wheels on the left side of the vehicle by observing the sign of the tangential acceleration (see item 3. above).

The wheel-mounted electronic modules of the different wheels are independent one from the other so that normally they will not send out signals at the same time. If the signals received from different wheels are to be compared in the electric evaluation unit of the receiver in order to determine the location in the vehicle of a wheel characterised by a given identifier, then the signals, or signals derived therefrom in the electronic evaluation unit, must be stored temporarily in the electronic evaluation unit in order to permit such comparison. The electronic evaluation unit must be equipped for this purpose with a volatile storage suited for that purpose. The man skilled in the art will know that this can be achieved by simple means, for example with the aid of a microprocessor, which may additionally perform the evaluation of the signals received. When it is not necessary to compare the signals arriving from different wheels, because the signals from a given wheel-mounted electronic module can as such be clearly allocated to a wheel location, then storing the signals temporarily will not be absolutely necessary.

As the signals to be compared are not generated simultaneously, it may happen that a signal from a right-hand wheel, that has been produced while the vehicle was accelerated, is compared with a signal from a left-hand wheel, that was generated while the vehicle was decelerated. In this case, it is not possible to distinguish between right and left wheels from the sign of the tangential acceleration b alone. It is therefore proposed, according to a preferred further development of the invention, to determine the variation over time of the speed $\omega$ or its reciprocal value T simultaneously with the determination of the tangential acceleration b and its sign on each wheel, and to send such variation to the receiver together with the sign of the tangential acceleration b. This is done because the sign of the variation over time d$\omega$/dt of the speed $\omega$ indicates if the vehicle was accelerated (positive sign) or decelerated (negative sign). Correspondingly, the sign of the variation over time dT/dt of the period T indicates if the vehicle was accelerated (negative sign) or decelerated (positive sign). By jointly evaluating the sign of the variation over time d$\omega$/dt of the speed $\omega$ and dT/dt of the period T and the sign of the tangential acceleration b for each wheel one can now clearly differentiate between right wheels and left wheels. To this end, one forms for each wheel in the central electronic evaluation unit of the receiver the product of those signs, which product will be opposite for wheels on the left side of the vehicle to the product of the signs for wheels on the right side of the vehicle, irrespective of whether the vehicle was accelerated or decelerated. It is a requirement for this purpose that the acceleration sensors must be equally oriented relative to the respective wheel, which can be guaranteed for identical wheel-mounted electronic modules by mounting them in the same position on the several wheels. It is then also possible to determine in advance for the envisaged mounting position which sign the product used for distinguishing between right and left wheels is to have for wheels on the right side of the vehicle and for wheels on the left side of the vehicle.

Let it be assumed that the sign of the tangential acceleration b at a right wheel is positive when the vehicle is being accelerated; then the sign will be negative for a left wheel, and the sign of the variation over time $d\omega/dt$ of the speed $\omega$ will be positive for the wheels on both sides of the vehicle. The product of the signs then is sign($d\omega/dt$). sign $b=(+1)(+1)=+1$ for the right wheel and sign($d\omega/dt$). sign $b=(+1)(-1)=-1$ for the left wheel.

From the above it results that the left wheel and the right wheel distinguish themselves one from the other by the sign of the product.

Let it now be assumed that the signal on the right wheel was generated while the vehicle was being accelerated, whereas the signal on the left wheel was generated while the vehicle was being decelerated. The product of the signs then is equal to:

sign($d\omega/dt$). sign $b=(+1)(+1)=+1$ for the right wheel and sign($d\omega/dt$). sign $b=(-1)(+1)=-1$ for the left wheel.

The left wheel and the right wheel can then be distinguished one from the other by the product of the signs in the same way as in the case assumed first. The discrimination between the left and the right wheel is unambiguous, regardless of whether the vehicle was accelerated or decelerated.

Once discrimination between the left and the right wheels has been effected in this way, when the vehicle has two axles, it is further possible with the aid of two antennas, one of which is assigned to the wheels on the front axle of the vehicle, while the other one is assigned to the wheels on the rear axle of the vehicle, to determine which of the left wheels is located in front and which is located at the rear and which of the right wheels is located in front and which is located at the rear, by evaluating the intensity (reception amplitude) of the signals received. This is so because an antenna arranged in the neighbourhood of the front axle will on average receive signals originating from the front wheels with a higher amplitude than signals originating from the rear wheels. Conversely, an antenna arranged near the rear axle will on average receive signals originating from the rear wheels with higher amplitude than signals originating from the front wheels. For this purpose, the antennas need not even be arranged midway between the right and the left wheels, but may be offset from the centre, because discrimination between front wheels and rear wheels is in any case possible by combining the information on the sense of rotation and the reception amplitude.

In the case of vehicles with more than two axles one can assign a separate antenna to each axle.

In the case of a vehicle with two axles there is even the possibility to do with a single antenna provided the latter is arranged either closer to the front axle or closer to the rear axle, but in such a way that signals can be received by the antenna from all four wheels with a sufficiently high amplitude. For determining the signal intensities, instead of using a single signal a sequence of a number of signals originating from one and the same wheel can be used in order to improve the accuracy of the intensity-determining process. As regards a statistical method suited for this purpose, reference is expressly made to the disclosure of DE 196 08 478 A1 and DE 196 08 479 A1.

Under certain circumstances the alternating portion, resulting from the influence of the gravitational acceleration g, of the signal emitted by the tangential acceleration sensor is not very clearly distinguishable from the signal background. Noise, vibrations and other interfering influences in the acceleration signal that may occur especially at higher driving speeds may result in one or the other determination of the speed of the wheel or of its reciprocal value and of its variation over time to be incorrect. In order to improve the reliability of the discrimination between wheels on the right side and wheels on the left side of the vehicle, it is proposed according to an advantageous further development of the invention to repeatedly form and integrate, in succession over time, the product forming the criterion for distinguishing between wheels on the right side and wheels on the left side. Let it be assumed that the product formed as criterion has the value -1 in a particular case. If the product is always determined correctly, the integration only has the effect to add the values -1 and thus results in a clearly negative value. If faulty measurements occur, these may lead to +1 values appearing in the sequence of -1 values. However, assuming plausibly that the correct values will be higher in number, the integral will finally become clearly negative also in such a case affected by faults. The integration time used in any such case can be fixed by experience so as to guarantee that the value of the integral will in any case stabilise either on a positive or on a negative value.

In order to be able to distinguish between wheels on the right side of the vehicle and wheels on the left side of the vehicle, the only thing that matters lastly is the sign formed as a criterion, which must be determined with sufficient reliability. The numerical value to which the sign is assigned is of no importance whatever. In determining the product of the signs of the tangential acceleration b and the variation over time dT/dt or the period T or the variation over time $d\omega/dt$ of the speed $\omega$ of the wheel, the signs may therefore be linked to with any numerical values. To say it in other words: It is not necessary to normalise the tangential acceleration b measured and the variation over time dT/dt of the period T determined or the variation over time $d\omega/dt$ of the speed $\omega$ determined to standard values prior to multiplying them for the purpose of determining the sign of their product. Rather, the instantaneous value of the tangential acceleration b obtained by the measurement or evaluation step can be multiplied as it is with the instantaneous value of the variation over time dT/dt of the period T or the variation over time $d\omega/dt$ of the speed $\omega$ of the wheel, giving due consideration to their signs, and can be integrated over time in order to obtain a safe criterion for discriminating between right wheels and left wheels.

BRIEF DESCRIPTION OF DRAWING FIGURES

Figure 2:
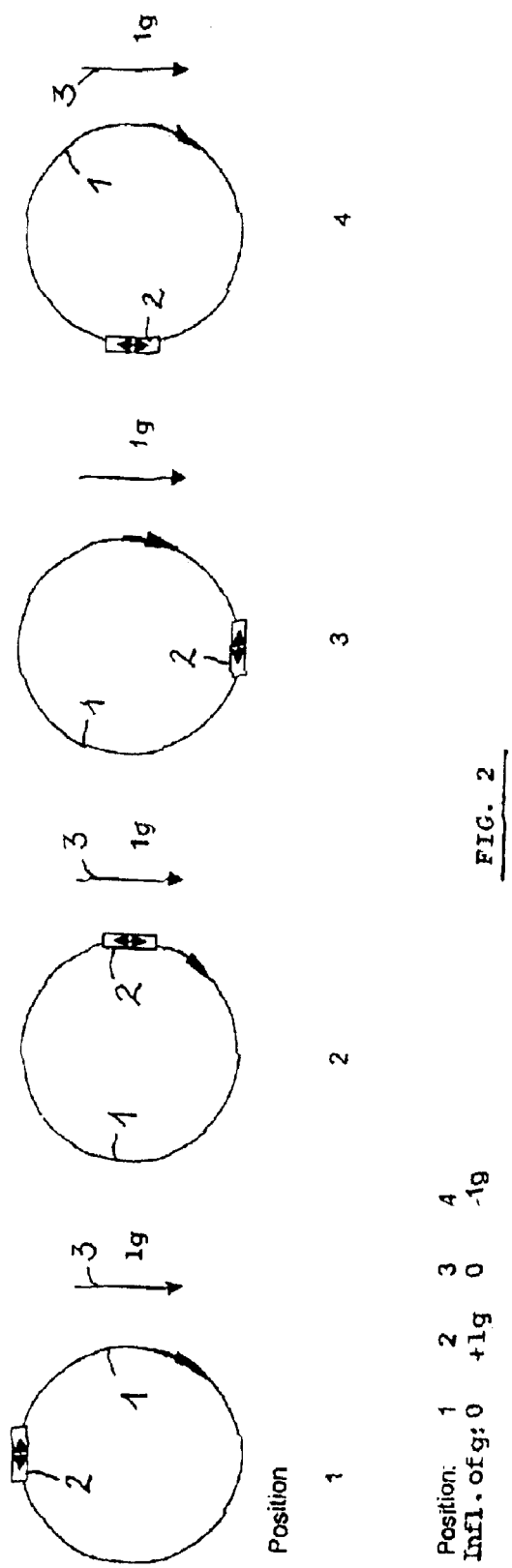

FIG. 1 shows a flow diagram of the method according to the invention for the discrimination between wheels on the right side of the vehicle and wheels on the left side of the vehicle; and FIG. 2 shows, in diagrammatic form, the influence which the gravitational acceleration has on the measurement of the tangential acceleration on one wheel.

DETAILED DESCRIPTION OF THE PREFERRED EMBODIMENTS

In FIG. 1 the tangential acceleration b is initially determined for a selected wheel by the acceleration sensor in the wheel-mounted electronic module. In a second step, the direct-current portion b= and the alternating portion b~ resulting from the influence of the gravitational acceleration g are separated by filtering the electric signal for the tangential acceleration b emitted by the acceleration sensor. The period T of the alternating portion b~ is determined in a third step. The variation over time dT/dt of the period T is determined in a fourth step. In a fifth step, the direct-current portion b= is multiplied by the variation over time dT/dt giving due consideration to their signs. As a result of that multiplication, one obtains a value D linked to a sign which will be described hereafter as the instantaneous sense-of-rotation value. In a second step, the instantaneous sense-of-rotation value is integrated over a certain period of time so that a safe sense-of-rotation value $\underline{D}$ is obtained:

$$\underline{D} = \int_{t_1}^{t_2} D\,dt$$

The integration time t2−t1 may be firmly preselected, based on experience, or may be flexibly selected so that the evaluation circuit performing the integration will continuously check the integration value to see if its sign stabilises, and will break off the integration process when the sign has stabilised. From the stabilised sign it can then be clearly concluded if the wheel observed is located on the right side of the vehicle or on the left side of the vehicle.

The way in which the gravitational acceleration g takes influence on the tangential acceleration b measured is clearly obvious from the representation of FIG. 2. FIG. 2 shows a wheel 1 with a wheel-mounted electronic module 42 mounted thereon in four different positions differing each by a quarter of a revolution of the wheel. Gravitational acceleration g always acts vertically in downward direction as indicated by arrow 3. In its position 1 the wheel-mounted electronic module 2 occupies its uppermost position. Gravitational acceleration g acts in vertical direction relative to the tangential acceleration b in this position and does not change its value.

In the illustrated position 2, the wheel 1 has turned to the right by a quarter of a revolution. The tangential acceleration b encountered on the wheel-mounted electronic module 2 is equally directed to the gravitational acceleration g in this case so that the tangential acceleration b is instantaneously increased by the gravitational acceleration g.

In the illustrated position 3 the wheel 1 has turned to the right by a further quarter of a revolution, and the wheel-mounted electronic module 2 occupies its lowermost position. The tangential acceleration b encountered on the wheel-mounted electronic module 2 acts perpendicularly to the gravitational acceleration g and is therefore not changed by the latter.

In the illustrated position 4 the wheel 1 has turned to the right by an additional quarter of a revolution. The tangential acceleration b encountered on the wheel-mounted electronic module 2 is oppositely directed in this position to the gravitational acceleration g when the vehicle is being accelerated, so that the gravitational acceleration g reduces the tangential acceleration b. The influence of the gravitational acceleration g on the tangential acceleration b is indicated in the small table in FIG. 1 by the measured values 0; 1 g; 0 and −1 g.

The process step 1, namely determining the tangential acceleration b as a function of time, must be carried out in the respective wheel-mounted electronic module 2. The further process steps are best carried out in the central electronic evaluation unit of the receiver to which the measured tangential acceleration b is transmitted in the form of radio signals.

According to another advantageous further development of the invention, the speed ω of the wheel, that has been determined according to the invention, is used for controlling the transmitter of the wheel-mounted electronic module. This provides the possibility to activate the transmitter at longer time intervals under less dangerous driving conditions and at shorter time intervals under potentially more dangerous driving conditions. There is especially the possibility to control the transmitter in such a way that normally the time intervals, at which signals are emitted, will be reduced as the speed of the wheel increases. These time intervals, which are described in this context also as second time intervals, are normally longer than the first time intervals at which measurements of the tyre pressure are effected by the wheel-mounted electronic module. As long as the measurements of the tyre pressure do not indicate that a dangerous situation exists (normal case), it is not necessary that each non-dangerous measured value be transmitted to the receiver and be brought to the driver's knowledge. In such a normal case it will, therefore, be sufficient for the wheel-mounted electronic module to get into contact with the receiver at longer second time intervals in order to indicate its serviceability. Conveniently, these second time intervals should be selected to be longer at lower speed and shorter at higher speed, which is rendered possible in a simple way by determining the speed in the wheel-mounted electronic module according to the invention. If the reciprocal value, namely the period T, is determined in the wheel-mounted electronic module instead of the speed ω, then the control of the second time intervals of the transmitter can be effected in a corresponding way.

In dangerous cases, when the pressure sensor has determined that a dangerous pressure deviation has occurred, the second time intervals can be reduced, by deviation from the normal condition, to the first time intervals and the first time intervals can be reduced relative to the normal condition, in order to be able to detect and react to the potentially dangerous pressure deviations, especially a rapid pressure drop, by increased measuring and transmission rates.

What is claimed is:

1. A method of determining the speed of a first wheel and a second wheel on a motor vehicle by a signal produced by a tangential acceleration sensor mounted on each wheel, and distinguishing the signals produced by the acceleration sensor on said first wheel and the acceleration sensor on said second wheel, the method comprising the steps of:

mounting said acceleration sensors in equal mounting positions on said wheels such that a sign of a tangential acceleration signal resulting from the motion state of said first wheel will be opposite a sign of a tangential acceleration signal resulting from the corresponding motion state of said second wheel;

measuring the tangential acceleration signal for each wheel;

determining the sign of the tangential acceleration signal for each wheel;

measuring the frequency of an alternating signal contained in the tangential acceleration signal, for each wheel, the alternating signal being produced by the influence of gravitational force on said acceleration sensors;

correlating the frequency of the alternating signals with the speed of a wheel;

determining a sign of a change in the frequency of the alternating signals over time for each wheel when the speed of the wheels varies;

forming a product of the sign of the tangential acceleration signal and the sign of the change in frequency of the alternating signal over time, for each wheel; and distinguishing the signals of the acceleration sensors by the product of the signs.

2. The method according to claim 1 further comprising the step of integrating over a period of time the product of the signs for each wheel, which product has been formed given due consideration to the sign of the tangential acceleration signal and the sign of the change in frequency of the alternating signal over time.

3. The method according to claim 2 wherein the integration step is continued until a sign of the value of the integral has stabilised.

4. The method according to claim 1 further comprising the step of providing equipment for monitoring and signaling by radio any pressure change in pneumatic tires mounted on each of said wheels, said equipment comprising:

a current source, said acceleration sensor for determining the speed of the wheel, a pressure sensor measuring the tyre pressure at first time intervals, and a transmitter which transmits at second time intervals, that are longer than or equal to the first time intervals, information on the measured tyre pressure as well as on the measured tangential acceleration signal to a receiver located in the vehicle, the second time intervals are controlled in dependence on the frequency of the respective wheel.

5. A method of determining the speed of a first wheel and a second wheel on a motor vehicle by a signal produced by a tangential acceleration sensor mounted on each wheel, and distinguishing the signals produced by the acceleration sensor on said first wheel and the acceleration sensor on said second wheel, the method comprising the steps of:

mounting said acceleration sensors in equal mounting positions on said wheels such that a sign of a tangential acceleration signal resulting from the motion state of said first wheel will be opposite a sign of a tangential acceleration signal resulting from the corresponding motion state of said second wheel;

measuring the tangential acceleration signal for each wheel;

determining the sign of the tangential acceleration signal for each wheel;

measuring the period of an alternating signal contained in the tangential acceleration signal, for each wheel, the alternating signal being produced by the influence of gravitational force on said acceleration sensors;

correlating the period of the alternating signals with the speed of a wheel;

determining a sign of a change in the period of the alternating signals over time for each wheel when the speed of the wheels varies;

forming a product of the sign of the tangential acceleration signal and the sign of the change in period of the alternating signal over time, for each wheel; and distinguishing the signals of the acceleration sensors by the product of the signs.

6. The method according to claim 5 further comprising the step of integrating over a period of time the product of the signs for each wheel, which product has been formed given due consideration to the sign of the tangential acceleration signal and the sign of the change in period of the alternating signal over time.

7. The method according to claim 6 wherein the integration step is continued until a sign of the value of the integral has stabilised.

8. The method according to claim 5 comprising the step of providing equipment for monitoring and signaling by radio any pressure change in pneumatic tires mounted on each of said wheels, said equipment comprising:

a current source, said acceleration sensor for determining the speed of the wheel, a pressure sensor measuring the tyre pressure at first time intervals, and a transmitter which transmits at second time intervals, that are longer than or equal to the first time intervals, information on the measured tyre pressure as well as on the measured tangential acceleration signal to a receiver located in the vehicle, the second time intervals are controlled in dependence on the period of the respective wheel.

* * * * *